Patented Oct. 24, 1939

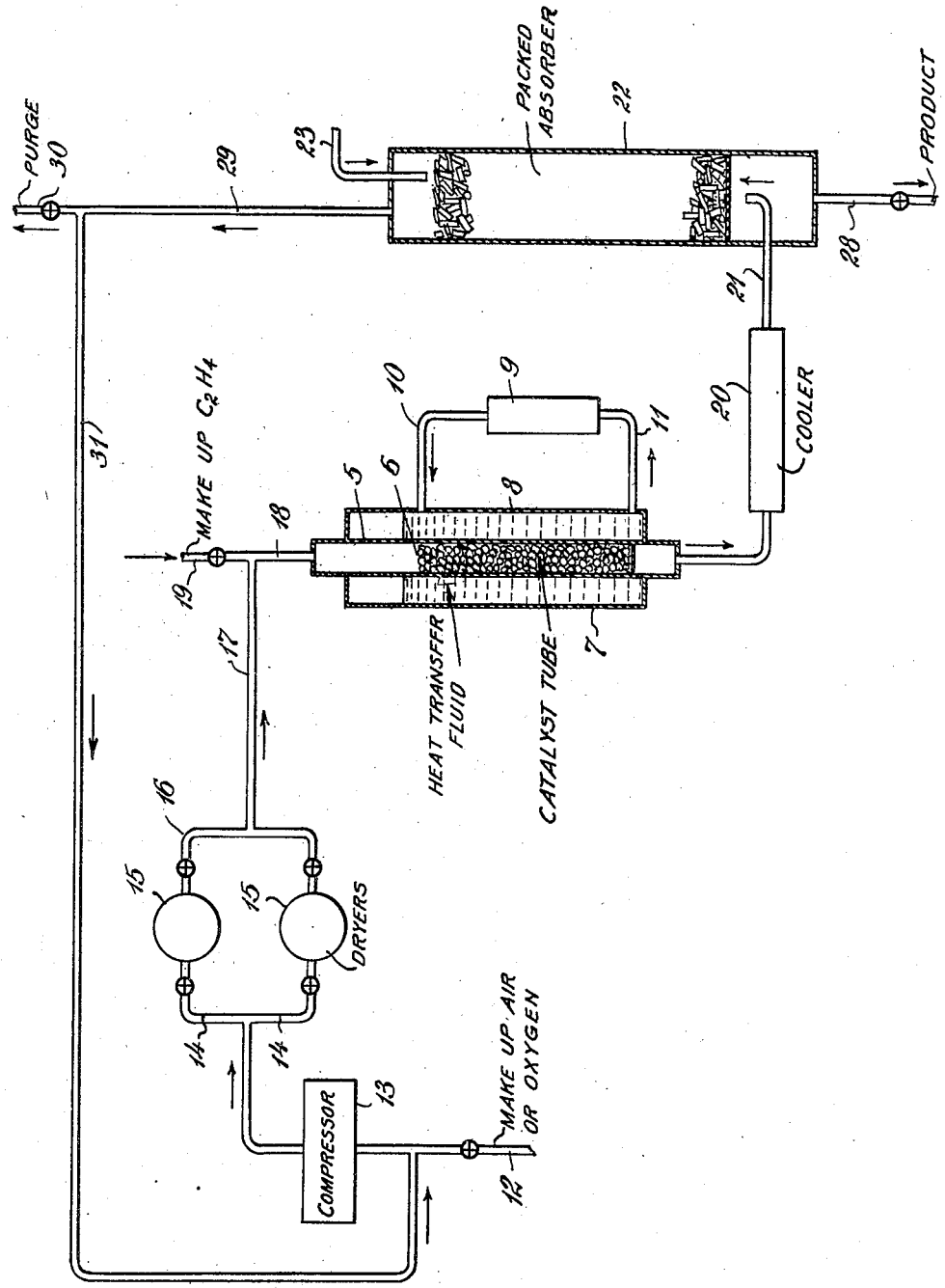

2,177,361

UNITED STATES PATENT OFFICE 2,177,361

PRODUCTION OF OLEFIN OXIDES

Ray M. Carter, Glenbrook, Conn., assignor to U. S. Industrial Alcohol Co., New York, N. Y., a corporation of West Virginia Application June 22, 1939, Serial No. 280,664

6 Claims. (Cl. 260—348)

This invention relates to the production of olefin oxides and derivatives therefrom, and particularly to the oxidation of ethylene with oxygen or air and the recovery of ethylene oxide in commercially practicable quantities. While the invention will be described more particularly in connection with the production of ethylene oxide, the method may be applied similarly to the oxidation of other members of the ethylene series, such as propylene.

The oxidation of ethylene has been suggested heretofore, but no practicable method has been available whereby ethylene oxide and its derivatives can be produced in commercial quantities as a result of the direct oxidation of ethylene. The yield of ethylene oxide by methods heretofore known or suggested is so small as not to warrant any hope of successful commercial application.

It is the object of the present invention to provide a simple and effective method, readily adaptable for commercial application and capable of yielding olefin oxides in quantities sufficient to warrant operation for industrial purposes.

Another object of the invention is the provision of a method of oxidizing ethylene under regulated conditions, whereby the yield of ethylene oxide is materially increased and the certainty of successful operation is assured.

Other objects and advantages of the invention will be apparent as it is better understood by reference to the specification and accompanying drawing, which illustrates diagrammatically a flow sheet including apparatus adapted for the practice of the invention, it being understood that some of this apparatus is not essential, although the method may be conducted efficiently therein.

In carrying out the invention, a variety of factors require careful regulation, as hereinafter more fully explained. In general, the method depends upon the selection of a suitable catalyst and the arrangement of the catalyst to permit the passage of gas mixtures including ethylene and oxygen therethrough under regulated temperature conditions, to ensure the desired results. The gaseous mixture which is delivered to the catalyst consists of oxygen, with or without diluents, with a carefully regulated proportion of ethylene admixed therewith. Conveniently, the source of oxygen is air carrying nitrogen as a natural diluent. Oxygen may, however, be supplied from any suitable source, and inert diluents including nitrogen, carbon dioxide, etc., can be added to the mixture in proper proportions to facilitate the reaction.

Water or water vapor is not a desirable constituent of the gaseous mixture, and its presence in the reacting gases has a deleterious effect far out of proportion to the amount in which it is present in those gases, probably due to the fact that water vapor is strongly adsorbed by the catalyst, thus blanketing the catalyst against contact with the ethylene and oxygen. Nitrogen, the natural diluent of the air, is not so strongly adsorbed, and has less deterrent effect on the production of ethylene oxide. I have discovered that the yield of ethylene oxide is greatly improved if the moisture content of the gaseous mixture expressed in terms of the dew point is below 0° C., and preferably below —10° C. Substantial further improvement in the yield results from decreasing the dew point to —55° C. or lower. Consequently, the oxygen-containing gas which is mingled with the ethylene before being passed over the catalyst should be freed from its moisture content by suitable means for that purpose, so that the amount of moisture in the gaseous mixture entering the catalyst chamber is not substantially above the amount represented by the dew point of 0° C., and a dew point of —10° C. or lower is preferred because of the resulting improvement in the yield of ethylene oxide. The removal of the moisture to the point desired is most readily accomplished by passing the oxygen-containing gas to be mingled with the ethylene, after compression to a pressure sufficient to cause the gaseous mixture to travel through the apparatus at the desired velocity, through a suitable disiccating material which is adapted to absorb the moisture. The oxygen-containing gas thus freed from moisture is then mixed with the desired proportion of ethylene or ethylene-containing gases, supplied at the pressure of the air or oxygen mixture.

The gaseous mixture entering the catalyst chamber may contain approximately 1% to 10% of ethylene by volume, and is delivered to a catalyst in the form of nodules or other relatively small pieces, so that the gaseous mixture travels therethrough with the maximum possible surface contact. The temperature of the reaction is maintained in any suitable manner, but preferably by surrounding the catalyst chamber with a jacket containing a heat transfer fluid which is maintained at a suitable temperature. The temperature of the catalyst may be raised, thus, and thereafter maintained at the proper level, any surplus heat generated within the catalyst being automatically withdrawn by transfer to the fluid.

The catalytic reaction within the chamber converts a substantial proportion of the ethylene into ethylene oxide, the reaction being in the nature of a selective oxidation. The gaseous mixture containing ethylene oxide is withdrawn from the catalyst chamber, and after cooling in a suitable apparatus the mixture is delivered to an absorber in which the ethylene oxide is selectively separated from the remainder of the gaseous mixture, a part of which is recirculated and admixed with make-up air or a gaseous mixture containing oxygen to form the oxygen-containing gas which, after having moisture removed therefrom is admixed with the ethylene and then passed over the catalyst. The balance of the effluent gas from the absorber may be discharged. Absorption of the ethylene oxide is accomplished by supplying a suitable liquid absorbing agent such as water.

In order that the invention may be more clearly understood, reference is made to the accompanying drawing, in which 5 indicates a tubular chamber or plurality of tubular chambers containing the catalyst 6. The chamber or chambers are surrounded by a jacket 7 adapted to contain a heat transfer fluid 8 which may be circulated through an apparatus 9 and there heated or cooled. Pipes 10 and 11 deliver the fluid to and from the jacket. The temperature to be maintained is preferably within the range of 100° to 450° C.

Oxygen, or a gaseous mixture containing oxygen, such as air, is supplied through a pipe 12 and, after being admixed with recirculated effluent gas from a pipe 31, passes to a compressor 13 wherein the resultant mixture is compressed to a suitable pressure adapted to ensure the travel of the gaseous mixture through the apparatus at satisfactory velocity. The oxygen or oxygen-containing mixture is delivered through pipes 14 to one or the other of two dryers 15, which are filled with a suitable desiccating material such as alumina, silica gel, calcium chloride, or any of the well known desiccating agents adapted to remove moisture from gases. Two dryers are provided in order that one may be revivified or replenished by the application of heat or otherwise while the other is in use. After drying, the oxygen-containing mixture is delivered through the pipes 16 and 17 to the inlet pipe 18. At this point, ethylene or ethylene-containing gas is introduced through a pipe 19 and mingled with the oxygen-containing gas, the mixture being supplied to the catalyst chamber.

A variety of catalysts may be used. I have found that the most effective catalyst consists of silver on a carrier which is substantially aluminum oxide preferably admixed with a small proportion of aluminum silicate such as clay. Manufactured aluminum oxide such as "Alundum" affords a very satisfactory carrier, particularly when combined with a small proportion of clay. It is not essential, however, to include clay in the carrier.

The reaction between ethyene and the oxygen in the gaseous mixture proceeds more or less uniformly in contact with the catalyst, but zones of excessive temperature or "hot spots" may and do develop from time to time at various points in the catalyst bed. It is essential, therefore, that the dimensions of the catalyst chamber be such as to permit withdrawal of excess heat promptly from various parts of the catalyst bed, and that a uniform temperature be maintained by use preferably of a suitable heat transfer fluid in the jacket 8.

The gaseous mixture leaving the catalyst may contain from a fraction to 1 or more percent of ethylene oxide. This gaseous mixture is conveyed through a cooler 20 of any suitable form and thence through a pipe 21 to an absorber 22. The absorber is a column which may be filled with any suitable packing or trays to facilitate breaking up the absorbing liquid to afford the maximum possible surface contact with the gaseous mixture. The absorbing liquid may be water or other suitable aqueous solvent. The aqueous solvent is supplied through a pipe 23 and is withdrawn from the absorber through a pipe 28 carrying the ethylene oxide product of the operation. The water, or other aqueous solvent for the ethylene oxide may be supplied at any suitable temperature. Ordinarily it is supplied at room temperature or lower. The unabsorbed gaseous mixture escapes through a pipe 29 and may be discharged to the atmosphere through a pipe 30. A portion of the gaseous mixture which may contain some ethylene is, as already stated, returned through the pipe 31 and mixed with the air entering the compressor 13, to afford a cyclic operation and save a certain proportion of the ethylene which would be discharged otherwise to the atmosphere. In commercial operations the amount of effluent gas from the absorber 22 which is recirculated through the pipe 31 may comprise as much as 75% or more of the total of the oxygen-containing gas which is mingled with the ethylene to form the reacting gases, and as the temperature of the absorbing water with respect to the temperature of the reaction products entering the absorber 22 is such that the absorption of the ethylene oxide from the reaction products causes moisture to be added to the gases from which the ethylene oxide is separated, it is particularly essential, in such operations, that moisture be removed from the oxygen-containing gas if practical yields of ethylene oxide are to be obtained.

Two major reactions are possible in the catalyst bed, the desired reaction being the oxidation of ethylene to ethylene oxide. The amount of heat liberated by this reaction is relatively small, and the temperature of the catalyst bed is consequently slightly above that maintained in the surrounding jacket, so long as the reaction is functioning in accordance with the purpose of the invention. The other, and undesired reaction, is the oxidation of ethylene to carbon dioxide and water. The heat of reaction in this case is considerably greater, and the "hot spot" resulting from this reaction tends to be propagated through the catalyst bed. To control the operation, suitable indicating devices, for example a carbon dioxide recorder, may be connected to the outlet from the catalyst chamber so as to indicate any abnormal operation. Adjustment of the temperature of the jacket or modification of the proportions of constituents of the gaseous mixture will correct this condition.

In carrying out the invention, the catalyst is prepared as follows, it being understood that this represents a preferred embodiment of the invention and is here described as an example. In preparing the catalyst, I employ aluminum oxide ("Alundum") in which 10% of clay (principally aluminum silicate) has been bonded. The carrier consists essentially of aluminum oxide and aluminum silicate and is broken into fragments of suitable dimensions, roughly ⅜ by ½ inch. These fragments are then thoroughly soaked in a water solution of silver nitrate of sufficient strength to afford about 10% of silver on the finished catalyst. The solution containing the carrier is evaporated dryness. The carrier with the silver nitrate thereon is then subjected to reduction with hydrogen at a temperature of approximately 300° C. The carrier is thus impregnated with catalytic silver, and the catalyst is particularly active in the reaction involving the oxidation of ethylene. The impregnation of the carrier with silver may be accomplished in any convenient way. The method described affords, so far as I have observed, the most practicable and efficient operation, as well as a satisfactory catalyst having a relatively long life and superior activity.

Although silver nitrate is indicated as a suitable medium for the addition of silver to the carrier, other silver compounds can be employed, as for example silver chloride, carbonate, hydroxide or cyanide.

In the preferred embodiment of the invention, approximately 10% by weight of silver on the carrier produces, so far as I have observed, satisfactory results. It is, however, practicable to use greater or lesser quantities of silver in the catalyst. For example, from 1% to 50% by weight of the finished catalyst, depending upon the character and porosity of the carrier, may be used.

Although I prefer to reduce silver compounds on the carrier by hydrogen in the manner hereinbefore described, any of the well known methods of reduction, as for example with alcohol or even by heat alone, may be employed. The catalyst may be reduced externally of the catalyst chamber and introduced thereto, or reduction may be carried out within the catalyst chamber.

While I do not wish to be limited to any particular theory, I believe that the catalyst is promoted by the presence of very small proportions of alkali or alkaline earth metals which may be introduced through the inclusion of clay in the carrier or by the deliberate addition of alkali or alkaline earth metal compounds such as compounds of sodium, potassium, calcium, etc. For example, the addition of calcium compounds or of sodium compounds to the carrier materially improves the yield of ethylene oxide when the catalyst is employed in the manner hereinbefore described. Moreover, it appears that the addition of small amounts of alkali and alkaline earth metals or compounds thereof to the carrier materially improves the ruggedness of the catalyst, thereby extending its life. The effect of catalyst poisons, if any are present, is to some extent or entirely obviated by the inclusion of these materials in the carrier.

The carrier may be in rough, broken pieces of the size, approximately indicated. On the other hand, I have utilized successfully catalysts prepared with the carrier in more regular forms, as for example pellets, rings, etc. The particular form of the carrier is not important except in so far as it affords maximum surface contact with the gaseous mixture and thus reduces the necessary size of the catalyst chamber or increases the efficiency of an apparatus of given size.

As hereinbefore indicated, the improved result obtained by the present invention depends upon the elimination of water or water vapor from the reaction to such an extent that the amount of moisture present expressed in terms of the dew point preferably is below 0° C. Moreover, as the dew point decreases below −10° C., the yield of ethylene oxide increases to a quite marked extent, indicating that substantial elimination of moisture is an important requisite to the successful commercial application of the reaction. Improvement in yield continues as the dew point decreases to a minimum of approximately −55° C., and further improvement may be effected by utilizing even lower dew points.

As an example of the practical effect of reducing the dew point of the gaseous mixture entering the catalyst, I have passed 1535 feet per hour of a gaseous mixture containing ethylene and oxygen through a catalyst chamber including a catalyst as hereinbefore described, the temperature being maintained at substantially 350° C. The pressure was only that necessary to ensure travel of the gaseous mixture through the catalyst at the desired velocity. All conditions were maintained as constant as possible, with the exception of the moisture content of the gaseous mixture entering the catalyst chamber, which was purposely varied. The moisture content (expressed as dew points) and the yield of ethylene oxide were as follows:

| Dew point | Ethylene oxide |
|---|---|
|  | Grs/hr. |
| +11 to +15° C | 211 |
| +10 to +15 | 217 |
| 0 to +3 | 254 |
| 0 to +3 | 245 |
| −6 to −10 | 235 |
| −44 to −50 | 307 |
| −55 | 308 |

In another example, 860 feet per hour of the gaseous mixture containing ethylene and oxygen were passed through the catalyst under similar conditions. In this case, at a dew point of 0 to −5° C., the yield of ethylene oxide was 183 grams per hour. When the dew point was reduced to −50° C., the yield of ethylene oxide was 260 grams per hour.

In another example, I passed 1200 feet per hour of the gaseous mixture including ethylene and oxygen through the catalyst under the conditions previously described. The yield of ethylene oxide when the gaseous mixture had a dew point of −6 to −10° C. was 210 grams per hour. When the dew point was decreased to −50° C., the yield of ethylene oxide was 276 grams per hour.

The details of the apparatus as described herein are not essential to the invention, and various changes may be made in the form and construction thereof as well as in the catalyst and procedure, without departing from the invention or sacrificing any of its advantages.

This application is a continuation-in-part of my application, Serial No. 150,145, filed June 24, 1937, for Production of olefin oxides.

I claim:

1. In the method of producing olefin oxides in which an olefin and an oxygen-containing gas are subjected to contact with an active silver catalyst; the improvement which comprises separating the olefin oxide from the gases after contact with the catalyst by selective absorption with an aqueous solution under conditions which will cause moisture to be added to the gases from which the olefin oxide is separated, recycling at least a part of the effluent gas from said separation and mixing it with make-up oxygen-containing gas, and removing moisture from the resultant gaseous mixture, before it contacts the catalyst, until the moisture content of said gaseous mixture is less than that indicated by a dew point below —10° C.

2. In the method of producing ethylene oxide in which ethylene and an oxygen-containing gas are subjected to contact with an active silver catalyst; the improvement which comprises separating the ethylene oxide from the gases after contact with the catalyst by selective absorption with an aqueous solution under conditions which will cause moisture to be added to the gases from which the ethylene oxide is separated, recycling at least a part of the effluent gas from said separation and mixing it with make-up oxygen-containing gas, and removing moisture from the resultant gaseous mixture, before it contacts the catalyst, until the moisture content of said gaseous mixture is less than that indicated by a dew point below —10° C.

3. In the method of producing olefin oxides in which an olefin and an oxygen-containing gas are subjected to contact with a catalyst consisting essentially of aluminum oxide and silver; the improvement which comprises separating the olefin oxide from the gases after contact with the catalyst by selective absorption with an aqueous solution under conditions which will cause moisture to be added to the gases from which the olefin oxide is separated, recycling at least a part of the effluent gas from said separation and mixing it with make-up oxygen-containing gas, and removing moisture from the resultant gaseous mixture, before it contacts the catalyst, until the moisture content of said gaseous mixture is less than that indicated by a dew point below —10° C.

4. In the method of producing ethylene oxide in which ethylene and an oxygen-containing gas are subjected to contact with a catalyst consisting essentially of aluminum oxide and silver; the improvement which comprises separating the ethylene oxide from the gases after contact with the catalyst by selective absorption with an aqueous solution under conditions which will cause moisture to be added to the gases from which the ethylene oxide is separated, recycling at least a part of the effluent gas from said separation and mixing it with make-up oxygen-containing gas, and removing moisture from the resultant gaseous mixture, before it contacts the catalyst, until the moisture content of said gaseous mixture is less than that indicated by a dew point below —10° C.

5. In the method of producing olefin oxides in which an olefin and an oxygen-containing gas are subjected to contact with an active silver catalyst; the improvement which comprises separating the olefin oxide from the gases after contact with the catalyst by selective absorption with an aqueous solution under conditions which will cause moisture to be added to the gases from which the olefin oxide is separated, recycling at least a part of the effluent gas from said separation and mixing it with make-up oxygen-containing gas, and removing moisture from the resultant gaseous mixture, before it contacts the catalyst, until the moisture content of said gaseous mixture is less than that indicated by a dew point below 0° C.

6. In the method of producing ethylene oxide in which ethylene and an oxygen-containing gas are subjected to contact with an active silver catalyst; the improvement which comprises separating the ethylene oxide from the gases after contact with the catalyst by selective absorption with an aqueous solution under conditions which will cause moisture to be added to the gases from which the ethylene oxide is separated, recycling at least a part of the effluent gas from said separation and mixing it with make-up oxygen-containing gas, and removing moisture from the resultant gaseous mixture, before it contacts the catalyst, until the moisture content of said gaseous mixture is less than that indicated by a dew point below 0° C.

RAY M. CARTER.